United States Patent
Clark et al.

(10) Patent No.: US 9,627,166 B2
(45) Date of Patent: Apr. 18, 2017

(54) PARTIALLY INSULATED CATHODE (71) Applicant: Honeywell International Inc., Morristown, NJ (US)

(72) Inventors: Matthew Clark, Blaine, MN (US);
Dean E. Johnson, Orono, MN (US);
Bruce A. Seiber, Arden Hills, MN (US)

(73) Assignee: Honeywell International Inc., Morris Plains, NJ (US)

( * ) Notice: Subject to any disclaimer, the term of this patent is extended or adjusted under 35 U.S.C. 154(b) by 16 days.

(21) Appl. No.: 14/456,835

(22) Filed: Aug. 11, 2014

(65) Prior Publication Data

US 2016/0042906 A1 Feb. 11, 2016

(51) Int. Cl.
| | |
|---|---|
| H01J 1/02 | (2006.01) |
| H01J 17/06 | (2006.01) |
| H01J 17/16 | (2012.01) |
| H01J 9/02 | (2006.01) |
| G01C 19/66 | (2006.01) |

(52) U.S. Cl.
CPC ............ H01J 1/025 (2013.01); G01C 19/665 (2013.01); H01J 9/02 (2013.01); H01J 17/06 (2013.01); H01J 17/16 (2013.01)

(58) Field of Classification Search
None
See application file for complete search history.

(56) References Cited

U.S. PATENT DOCUMENTS

| | | | |
|---|---|---|---|
| 4,780,591 A * | 10/1988 | Bernecki | H05H 1/3405 |
| | | | 219/121.48 |
| 4,821,281 A | 4/1989 | Lind et al. | |
| 5,394,241 A | 2/1995 | Geen | |
| 6,853,667 B2 | 2/2005 | Seiber et al. | |
| 6,992,442 B2 | 1/2006 | Touchberry et al. | |
| 2002/0186740 A1 | 12/2002 | Seiber et al. | |
| 2011/0163181 A1 * | 7/2011 | Fujii | B41J 2/161 |
| | | | 239/102.2 |

FOREIGN PATENT DOCUMENTS

| | | |
|---|---|---|
| EP | 0213489 | 3/1987 |
| WO | 2012051790 | 4/2012 |

OTHER PUBLICATIONS

Warner et al, "1 W Operation of Singly Ionized Silver and Copper Lasers", "IEEE Journal of Quantum Electronics", Aug. 1978, pp. 568-570, vol. QE-14, No. 8, Publisher: IEEE.
European Patent Office, "Extended European Search Report from EP Application No. 15179548.1 mailed Nov. 30, 2015", "from Foreign Counterpart of U.S. Appl. No. 14/456,835", Nov. 30, 2015, pp. 17, Published in: EP.

* cited by examiner

Primary Examiner — Ashok Patel
(74) Attorney, Agent, or Firm — Fogg & Powers LLC (57) ABSTRACT

A partially-insulated cathode for exciting plasma in a plasma chamber is provided. The partially-insulated cathode includes a conductive structure enclosing a cavity having a cavity surface and an insulating material contiguously covering a portion of the cavity surface from the cavity opening up to an insulation height that is less than a cavity height. Cross-sections of the cavity in X-Y planes have at least one respective cavity-width. A cavity opening has a diameter less than a minimum cavity-width of the at least one cavity-width.

20 Claims, 8 Drawing Sheets

PARTIALLY INSULATED CATHODE

BACKGROUND

A cathode for use with a discharge plasma is a gas discharge device (e.g., a ring laser gyroscopes (RLG) cathode) has two wear-out mechanisms. The first is cathode sputter, and the second is cathode seal failure. Cathode sputter occurs when gas ions bombard the cathode during the running of the discharge in the ring laser gyroscope. The ion bombardment sputters metal from the cathode. At the same time, due to the biasing from the electrical source, the gas ions are temporarily held on the surface of the cathode. The metal sputtered from the cathode re-deposits on cooler areas of the cathode and on the block next to the cathode. When the metal sputtered from the cathode re-deposits on the cathode, it coats and traps the gas ions that are held on the surface of the cathode. This trapping of the gas ions decreases the life of the ring laser gyroscope by depleting the amount of gas available to maintain lasing and the discharge. A cathode sputter life for a currently available cathode is improved by increasing the inner diameter of the cathode.

The lifetime of the cathode seal is improved by increasing the annular width of the seal, which is often accomplished by decreasing the cathode inner diameter, increasing the cathode outer diameter, or both.

Prior art cathodes designed to address these wear-out mechanisms may be shorted by the plasma, which is shorted to the area that the cathode is intended to seal, and do not short to the larger inner diameter area as desired.

SUMMARY

The embodiments of the present invention provide a cathode and method of making a cathode and will be understood by reading and studying the following specification.

The present application relates to a partially-insulated cathode for exciting plasma in a plasma chamber. The partially-insulated cathode includes a conductive structure enclosing a cavity having a cavity surface and an insulating material contiguously covering a portion of the cavity surface from the cavity opening up to an insulation height that is less than a cavity height. Cross-sections of the cavity in X-Y planes have at least one respective cavity-width. A cavity opening has a diameter less than a minimum cavity-width of the at least one cavity-width.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present application. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense Embodiments of the present invention provide an insulating layer covering key areas of the partially-insulated cathode in order to avoid the plasma shorting problem described above, and to force the plasma to short to desired surfaces of the partially-insulated cathode. The insulating layer allows the parameters of the partially-insulated cathode to be optimized for both the wear-out mechanisms of cathode sputter and cathode seal failure. The embodiments of cathodes described herein eliminate the possibility of plasma shorting to undesirable areas of the cathode by forming non-conductive surfaces at the previously conductive surfaces at the edge of the inner cavity of the cathode.

In one implementation of this embodiment, the insulating layer allows the internal diameter of the cathode to be as large as possible while the cathode seal surface has a larger annular radius. In another implementation of this embodiment, the insulating material forces the plasma to short to areas well removed from the cavity opening. In yet another implementation of this embodiment, the insulating layer allows the internal diameter of the cathode to be as large as possible while forcing the plasma to short to areas well removed from the cavity opening and the cathode seal surface has a larger annular radius.

Figure 1A:
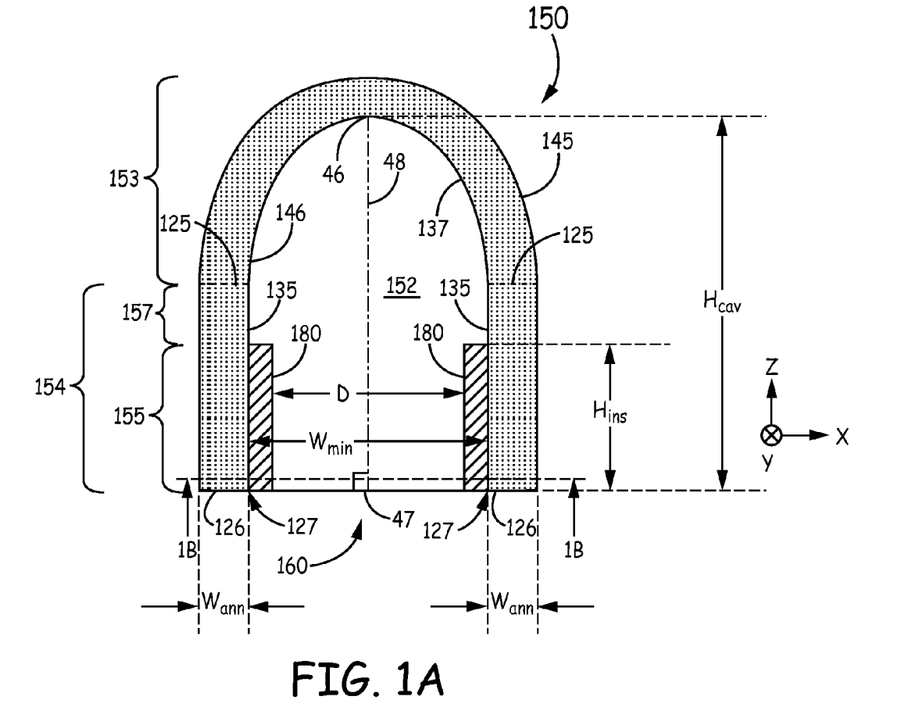
FIGS. 1A and 1B show cross-sectional views of an embodiment of a partially-insulated cathode in accordance with the present application.
Figure 1B:
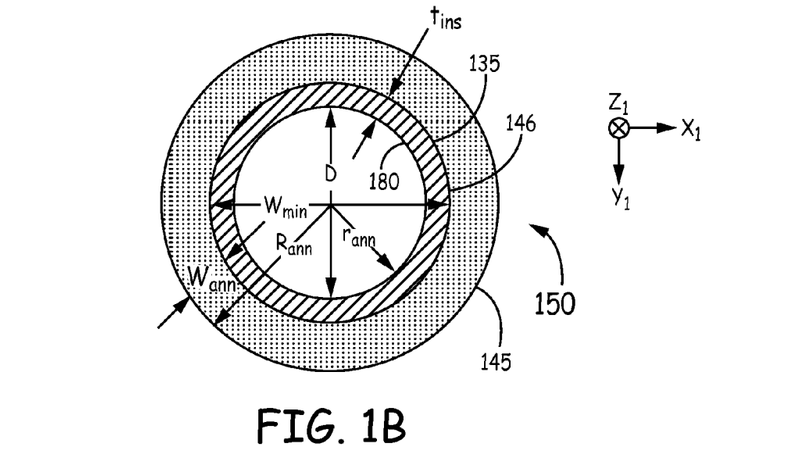

FIGS. 1A and 1B show cross-sectional views of an embodiment of a partially-insulated cathode 150 in accordance with the present application. FIG. 1A shows a cross-sectional view, in an X-Z plane, of the partially-insulated cathode 150. FIG. 1B shows a cross-sectional view, in an $X_1$-$Y_1$ plane, of the partially-insulated cathode 150 of FIG. 1A. The plane upon which the cross-section view of FIG. 1B is taken is indicated by section line 1B-1B in FIG. 1A. The partially-insulated cathode 150 includes a conductive structure 145 and an insulating material 180.

The conductive structure 145 has a cavity surface 146 enclosing a cavity 152 with a single cavity opening 160. Cross-sections of the cavity in X-Y planes have at least one respective cavity-width. An insulating material 180 contiguously covers a portion 155 of the cavity surface 146 from the cavity opening 160 up to an insulation height $H_{ins}$ that is less than a cavity height $H_{cav}$. The cavity opening 160 has a diameter D less than the minimum cavity-width $W_{min}$. As shown in FIG. 1B, the thickness of the insulating material 180 is $t_{ins}$. Thus, the cavity opening 160 has a diameter D equal to the minimum cavity-width $W_{min}$ minus twice the thickness $t_{ins}$ of the insulating material 180 (D=$W_{min}$−2 $t_{ins}$). For those cases in which the insulating material 180 is thin, the cavity opening 160 has a diameter D slightly less than the minimum cavity-width $W_{min}$.

As shown in FIG. 1B, the cross-section of the conductive structure 145 in the $X_1$-$Y_1$ plane has an annular-shape. The difference between the outer radius $R_{ann}$ and the inner radius is $r_{ann}$ is referred to herein as an annular radius $W_{ann}$ (i.e., the annular radius is $W_{ann}$=$R_{ann}$−$r_{ann}$). As shown in FIG. 1A, the conductive structure 145 has a base 126 or foot 126 that also has an annular-shape.

In the embodiment shown in FIGS. 1A and 1B, the cavity 152 is formed in the shape of a dome 153 conjoined with a cylinder 154. As defined herein, a cylinder is a tube having two opposing open ends in which the inner diameter (also referred to herein as the "cavity-width") of two or more cross-sections in the X-Y plane (FIGS. 1A and 1B) of the cylinder may be the same or may be different. Thus, it is to be understood that inner-cylinder surface 135 is not necessarily in the shape of a perfect cylinder but may be modified as shown and described herein.

The cylinder 154 has an inner-cylinder surface 135 that forms a portion of the cavity surface 146. The dome 153 has an inner-dome surface 137 that forms another portion of the cavity surface 146. The dome edge 125 represented generally at dashed lines 125 in FIG. 1A of the dome 153 is joined with the first edge (also represented generally at 125) of the cylinder 154.

The second edge 126 of the cylinder 154, which is also referred to herein as the base 126 or foot 126 of the conductive structure 145, opposes the first edge 125 of the cylinder 154. It is to be understood that the dome 153 conjoined with the cylinder 154 can be formed by machining a single block of conductive material to form the shapes of a dome 154 and a cylinder 154 as shown in FIG. 1A. It this case, the conjoining results from the machining and is not the result of any bonding operation of the dome edge 125 of the dome 153 to the first edge 125 of the cylinder 154.

The inner-cylinder surface 135 encloses at least one cavity-width W in at least one respective X-Y plane. As shown in FIG. 1A, all cross-sections in any X-Y plane (FIGS. 1A and 1B) of the cylinder 154 has the a single cavity-width (inner diameter) of W=$W_{min}$ while cross-sections in any X-Y plane (FIGS. 1A and 1B) of the dome 153 have unique inner diameters.

The inner-dome surface 137 includes a peak point 46. The cavity opening 160 is formed in the X-Y plane spanned by the edge 126 of the cylinder 154. The line where the inner-cylinder surface 135 intersects with the second edge 126 of the cylinder 154 shown in cross-sectional view of FIG. 1A as points 127. This line is the outer border of the cavity opening 160. As shown in FIG. 1B, the cavity opening 160 has the shape of a circle. In another implementation of this embodiment, the cavity opening 160 has other shapes. For example, the cavity opening 160 can have an elliptical shape, an oval shape, or a rectangular shape as is understandable to one skilled in the art.

The cavity 152 has a cavity height $H_{cav}$. The insulating material 180 covers a portion 155 of the inner-cylinder surface 135 of the cylinder 154. The insulating material 180 contiguously covers the portion 155 of the cylinder 154 from the cavity opening 160 up to an insulation height $H_{ins}$. Thus, the inner-cylinder surface 135 in the portion 155 is completely covered from the opening 160 to an insulation height $H_{ins}$. The insulation height $H_{ins}$ is less than the cavity height $H_{cav}$. The cavity height $H_{cav}$, as defined herein, extends from the center point 47 of the cavity opening 160 to the peak point 46 on the inner-dome surface 137 that opposes the center point 47 of the cavity opening 160. The line 48 from center point 47 to peak point 46 is normal to the plane X-Y that spans the cavity opening 160.

As shown in FIG. 1A, a portion 157 of the cavity surface 146 of the cylinder 154 is uncovered by the insulating material 180. As shown in FIG. 1A, the inner-dome surface 137 is also uncovered by the insulating material 180. In one implementation of this embodiment, the complete cavity surface 146 of the cylinder 154 is covered by the insulating material 180. In another implementation of this embodiment, the complete cavity surface 146 of the cylinder 154 and a portion of the inner-dome surface 137 are covered by the insulating material 180. In yet another implementation of this embodiment, the insulating material 180 covers the cavity surface 146 from the cavity opening 160 up to the insulation height $H_{ins}$ that is less than fifty percent of the cavity height $H_{cav}$. In yet another implementation of this embodiment, the insulating material 180 covers most of the cavity surface 146 from the cavity opening 160 up to the insulation height $H_{ins}$ so that the plasma is forced to be shorted to a small section of the inner-dome surface 137 includes the peak point 46. This embodiment is shown and described below with reference to FIG. 5E.

Figure 2A:
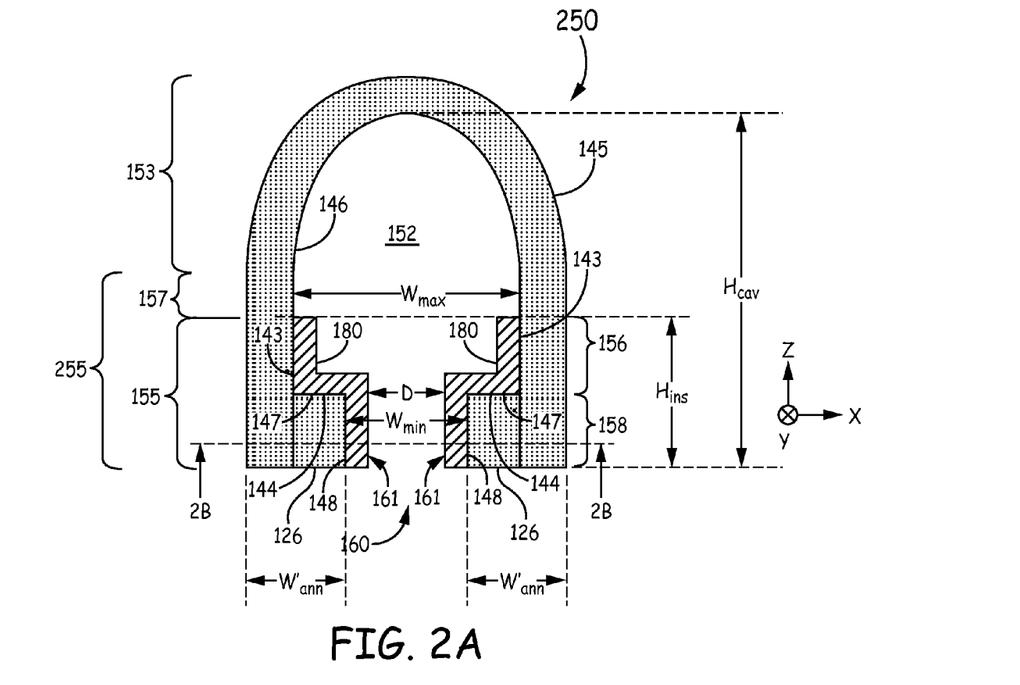
FIGS. 2A and 2B show cross-sectional views of an embodiment of a partially-insulated cathode in accordance with the present application.
Figure 2B:
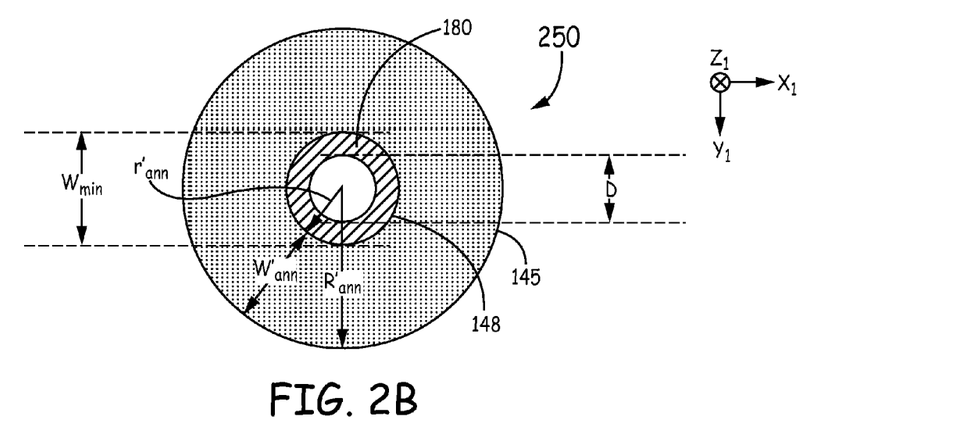

FIGS. 2A and 2B show cross-sectional views of an embodiment of a partially-insulated cathode 250 in accordance with the present application. FIG. 2A shows a cross-sectional view, in an X-Z plane, of an embodiment of a partially-insulated cathode 250. FIG. 2B shows a cross-sectional view, in an $X_1$-$Y_1$ plane, of the partially-insulated cathode 250 of FIG. 2A. The plane upon which the cross-section view of FIG. 2B is taken is indicated by section line 2B-2B in FIG. 2A. The partially-insulated cathode 250 includes a conductive structure 145 and an insulating material 180.

In the embodiment shown in FIGS. 2A and 2B, the cavity 152 is formed in the shape of a dome 153 conjoined with a modified cylinder 255. As shown in FIG. 2A, the modified cylinder 255 is a cylinder with two inner diameters: a maximum cavity-width $W_{max}$; and a minimum cavity-width $W_{min}$. There is a step 147 in the cavity surface 146 between the minimum cavity-width $W_{min}$ and the maximum cavity-width $W_{max}$. The insulating material 180 covers a portion 155 of the cavity surface 146 of the modified cylinder 255. A first portion 158 of the modified cylinder 255 has the minimum cavity-width $W_{min}$ and is covered by insulating material 180 so that an opening-portion 161 of the modified cylinder 255 is covered by the insulating material 180. A second portion 156 of the modified cylinder 255 has the maximum cavity-width $W_{max}$ and is covered by insulating material 180.

As shown in FIG. 2A, the insulating material 180 covers: the surface 148 of the modified cylinder 255 having the minimum cavity-width $W_{min}$; at least a portion 156 of the surface 143 of the modified cylinder 255 having the maximum cavity-width $W_{max}$; and a surface 144 of the step 147 between the minimum cavity-width $W_{min}$ and the maximum cavity-width $W_{max}$. The insulating material 180 covering the surface 144 of the step 147 is contiguous with the insulating material 180 covering the portion 156 of the surface 143 of the modified cylinder 255 having the maximum cavity-width $W_{max}$ and is also contiguous with the insulating material 180 covering the surface 148 of the portion 158 of the modified cylinder 255 having the minimum cavity-width $W_{min}$. Thus, all the cylinder surfaces 144, 145, and 148 in the portion 155 are completely covered by insulating material 180 from the opening 160 to an insulation height $H_{ins}$.

The portion 157 of the cavity surface 146 having the maximum cavity-width $W_{max}$ is uncovered by the insulating material 180. The cavity surface 146 of the cavity 152 that is in the dome 153 is also uncovered by the insulating material 180.

As shown in FIG. 2B, the conductive structure 145 has an annular-shaped base 126 or foot 126. The difference between the outer radius $R'_{ann}$ and the inner radius ran is $r'_{ann}$ is the annular radius $W'_{ann}$ (i.e., the annular radius is $W'_{ann}=R'_{ann}-r'_{ann}$).

Figure 3:
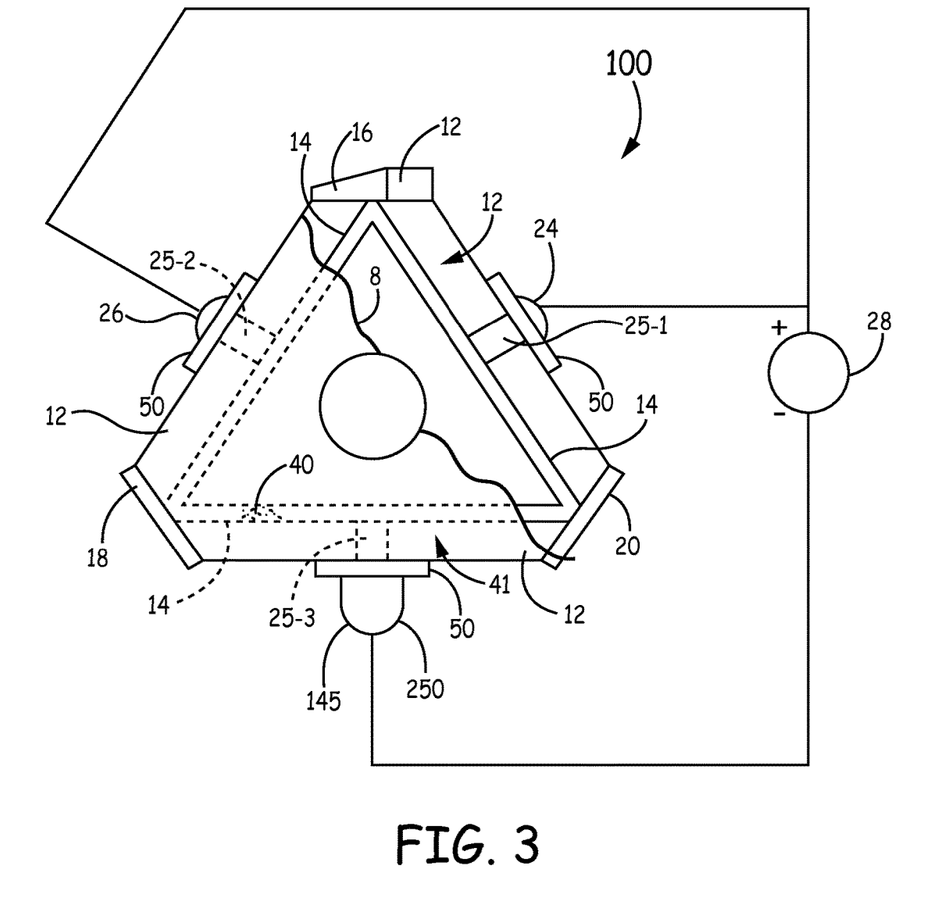
FIG. 3 shows an embodiment of a gas discharge device with the partially insulated cathode of FIGS. 2A and 2B in accordance with the present application.

FIG. 3 shows an embodiment of a gas discharge device 100 with the partially insulated cathode 250 of FIGS. 2A and 2B. The embodiment of the gas discharge device 100 shown in FIG. 3 is a ring laser gyroscope 100. Although the following discussion is directed to a ring laser gyroscope 100, the partially-insulated cathode 250 can be implemented on other types of gas discharge devices 100 as is understood by one skilled in the art. The partially-insulated cathode 250 shown in FIG. 3 can be replaced by any other embodiment of the partially-insulated cathodes described herein as is understandable to one skilled in the art.

Figure 4:
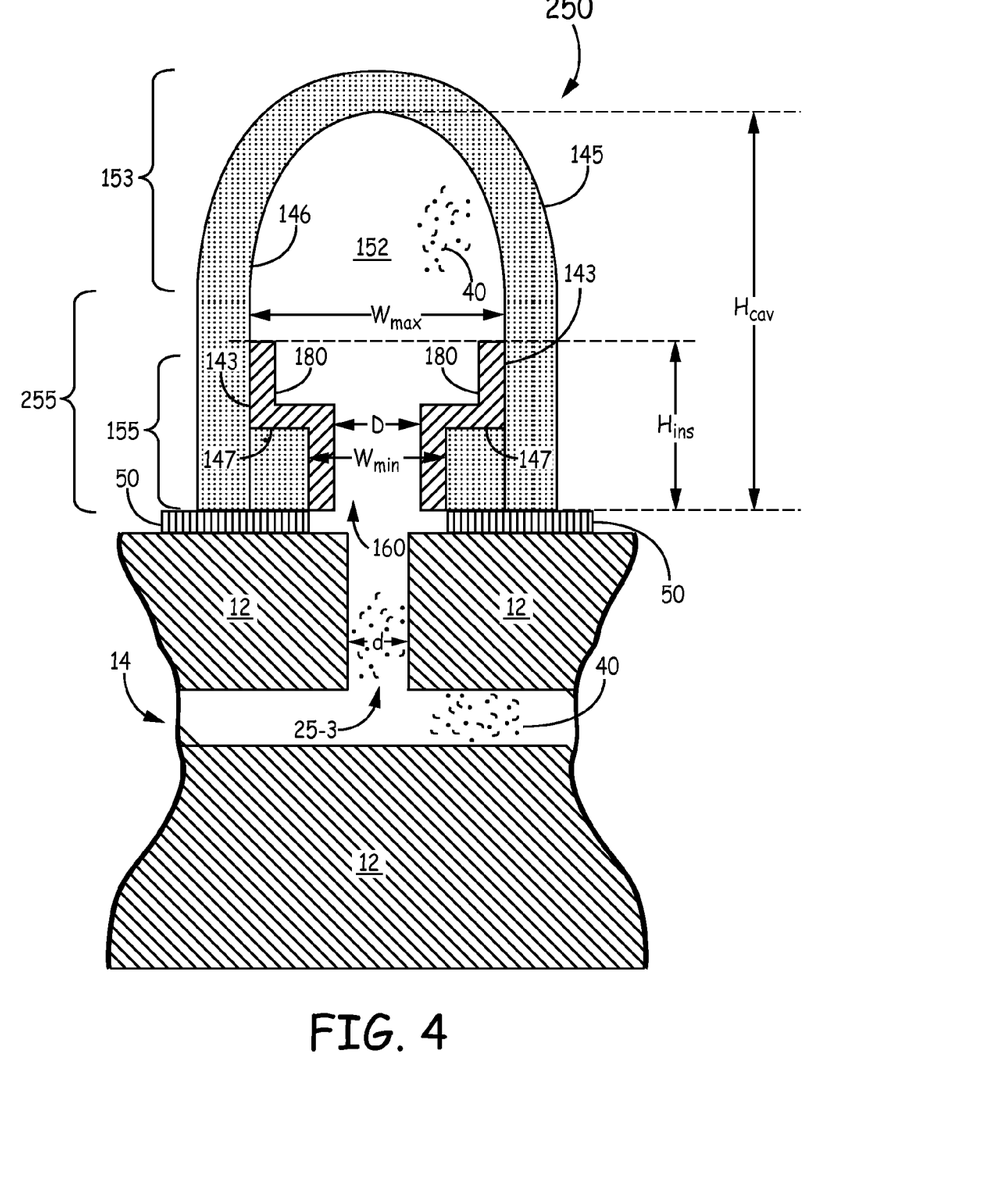
FIG. 4 shows an enlarged view of the partially-insulated cathode of FIGS. 2A and 2B attached to the block of the gas discharge device of FIG. 3.

FIG. 4 shows an expanded view of the partially-insulated cathode 250 attached to the block 12 of the gas discharge device 100 of FIG. 3. The partially-insulated cathode 250 as shown in FIGS. 3 and 4 is formed as described above with reference to FIGS. 2A and 2B. The partially-insulated cathode 250 is designed to excite plasma represented generally at 40 in a plasma chamber represented generally at 41 while avoiding the plasma shorting problem by forcing the plasma 40 to short to desired surfaces of the partially-insulated cathode 250.

As shown in FIG. 3, the ring laser gyroscope 100 is formed of a block 12 of material such as glass. The block 12 includes an interior passage 14 that communicates with openings at each of its corners. Mirrors 16, 18, and 20 are provided at the corners with one of the mirrors 16, 18, and 20 being used as a read-out device. The interior passage 14 and the mirrors 16, 18, and 20 define a plasma chamber 41 in the form of a closed laser resonant path. An upper portion of the block 12 (at the edge between the mirror 16 and mirror 20) is removed, as indicated by line 8, to show a cross section of the interior passage 14 and of the opening 25-1. The remainder of the block 12 is shown from the top and the interior passage 14 is indicated by the dashed lines.

The partially-insulated cathode 250 and the anodes 24 and 26 are attached to respective surfaces of the block 12. The anode 24 covers opening 25-1 formed through the block 12 to the interior passage 14. The anode 26 covers opening 25-2 formed through the block 12 to the interior passage 14.

As show in FIGS. 3 and 4, the partially-insulated cathode 250 covers opening 25-3 formed through the block 12 to the interior passage 14. The opening 160 of the partially-insulated cathode 250 has a diameter D that is larger than the diameter d (FIG. 4) of the opening 25-3 in the block 12. The portion 155 of the partially-insulated cathode 250 abuts the block 12 through an annular seal 50 (FIG. 4). The partially-insulated cathode 250 is sealed by the seal 50 to the block 12 in order to contain the plasma 40 within the interior passage 14. In one implementation of this embodiment, the annular seal 50 is an indium seal. The anodes 24 and 26 are similarly sealed to the block 12.

As shown in FIG. 4, the partially-insulated cathode 250 and the anodes 24 and 26 are coupled to an electrical source 28 so as to energize gas in order to form laser plasma 40 in the interior passage 14. The plasma 40 is in: the interior passage 14 between the anode 26 and the partially-insulated cathode 250; the interior passage 14 between the anode 46 and the partially-insulated cathode 250; cavities of the anodes 24 and 26; and the cavity 152 of the partially-insulated cathode 250. All these regions are considered by one skilled in the art to be part of the plasma chamber 41. Therefore, a portion of the plasma 40 enters the cavity 250 and the cavity 152 is part of the plasma discharge of the ring laser gyroscope 100.

The gas ions of the plasma 40 do not readily attach to the insulating material 180 since the insulated area of the partially-insulated cathode 250 does not attract the plasma 40. Also, the insulating material 180 on the partially-insulated cathode 250 protects the coated portion from being bombarded by the ions. Thus, the insulating material 180 minimizes or prevents the sputtering metal off of the partially-insulated cathode 250 and trapping of gas ions. Thus, the gas ions of the plasma 40 are depleted less quickly in the partially-insulated cathode 250 as in a prior art cathode.

The embodiment of partially-insulated cathode 250 is advantageous in that plasma being shorted to the partially-insulated cathode 250 is forced to the wider inner diameter $W_{max}$ of the cavity 152. The insulating material 180 forces plasma 40 in the plasma chamber 41 to be directed to the preferred portion of the cathode, and thus increase sputter life of the partially-insulated cathode 250. The preferred portion of the partially-insulated cathode 250 is the larger diameter region 157 (FIG. 2A) and the dome 153 of the partially-insulated cathode 250. As shown in FIG. 1A, the preferred portion of the partially-insulated cathode 150 is the uncoated region 157 (FIG. 2A) and the dome 153 of the partially-insulated cathode 250.

The embodiment of the partially-insulated cathode 250 shown in FIGS. 2A, 2B, 3, and 4 advantageously increase the lifetime of the annular seal 50. As shown in FIG. 2B, the annular radius $W'_{ann}$ of the partially-insulated cathode 250 is larger than the annular radius $W_{ann}$ of the partially-insulated cathode 150 shown in FIGS. 1A and 1B (i.e., $W'_{ann}>W_{ann}$). Since it takes longer for an annular seal with a larger annular radius to wear out, the annular seal 50 (FIGS. 3 and 4) for the partially-insulated cathode 250 lasts longer than the seal for the partially-insulated cathode 150.

FIGS. 5A-5E show cross-sectional views of embodiments of partially-insulated cathodes in accordance with the present application. Each of the partially-insulated cathodes 260-264 include a conductive structure 145 having a cavity 152 that has a cavity surface 146 with an insulating material 180 covering a portion of the cavity surface 146. In each case, the insulating material 180 contiguously extends from the cavity opening 160 up to an insulation height $H_{ins}$ that is less than a cavity height $H_{cav}$.

The partially-insulated cathodes 260-264 include a conductive structure 145 enclosing a cavity 152 having a cavity surface 146 and an insulating material contiguously covering a portion of the cavity surface from the cavity opening 160 up to an insulation height $H_{ins}$ that is less than a cavity height $H_{cav}$. Cross-sections of the cavity 152 in X-Y planes have at least one respective cavity-width. The cavity opening 160 has a diameter less than a minimum cavity-width of the at least one cavity-width.

Figure 5A:
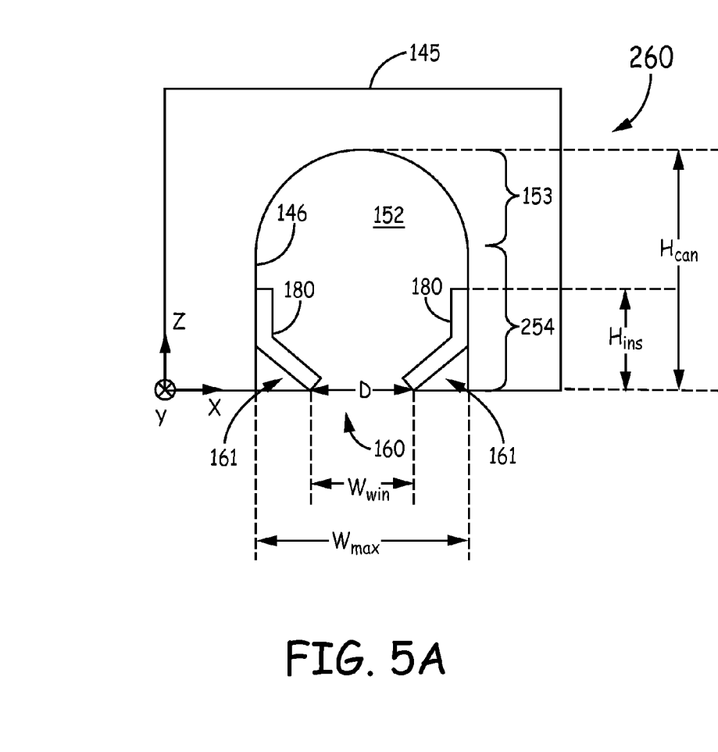
FIGS. 5A-5E show cross-sectional views of embodiments of partially-insulated cathodes in accordance with the present application.

FIG. 5A shows a cross-sectional view of an embodiment of a partially-insulated cathode 260. As shown in FIG. 5A, cavity surface 146 has the shape of a modified cylinder 254 and a dome 153. The width W of the opening-portion 161 of the modified cylinder 254 continuously changes from the minimum cavity-width $W_{min}$, which is the width of the cavity 152 at the cavity opening 160, to a maximum cavity-width $W_{max}$, then the cavity surface 146 maintains a constant width $W_{max}$ until the modified cylinder 254 merges into the dome 153. In this manner, for the modified cylinder 254, a first plurality of cross-sections in the X-Y plane have unique inner diameters while a second plurality of other cross-sections in the X-Y plane have the same diameter $W_{max}$.

Figure 5B:
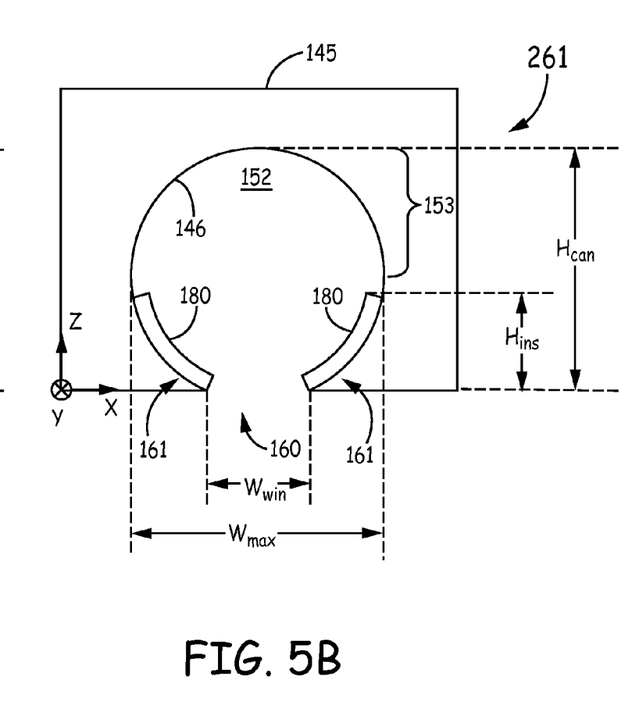

FIG. 5B shows a cross-sectional view of an embodiment of a partially-insulated cathode 261. As shown in FIG. 5B, the width W of the opening-portion 161 of the cavity 152 continuously changes from the minimum cavity-width $W_{min}$ to a maximum cavity-width $W_{max}$ and then decreases again in the dome 153. For the plurality of cross-sections in the X-Y plane (FIGS. 1A and 1B) of the partially-insulated cathode 261, there are two cross-sections in the X-Y plane have the same diameter.

Figure 5C:
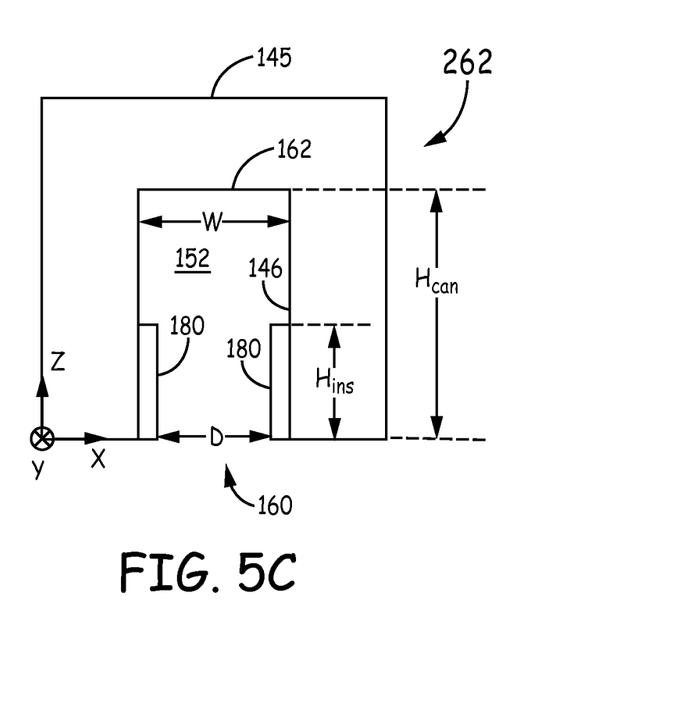

FIG. 5C shows a cross-sectional view of an embodiment of a partially-insulated cathode 262. As shown in FIG. 5C, the cavity 152 is cylindrical in shape so that the plurality of cross-sections in the X-Y plane of the cavity 152 all have the same diameter W. The surface 162 of the cavity 152 opposing the cavity opening 160 is flat (or almost flat). Thus, the at least one cavity-width is one width W.

Figure 5D:
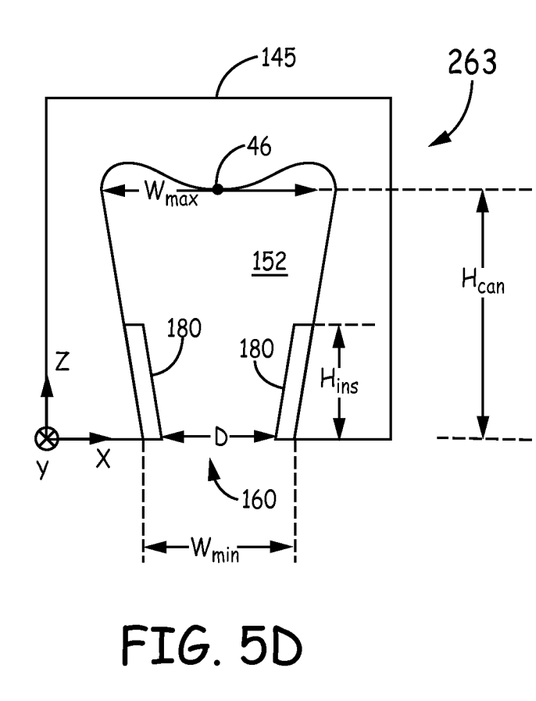

FIG. 5D shows a cross-sectional view of an embodiment of a partially-insulated cathode 263. As shown in FIG. 5D, the shape of the cavity 152 is irregular. In the partially-insulated cathode 263, the peak point 46 is not the furthest point from the center point 47 of the cavity opening 160.

Figure 5E:
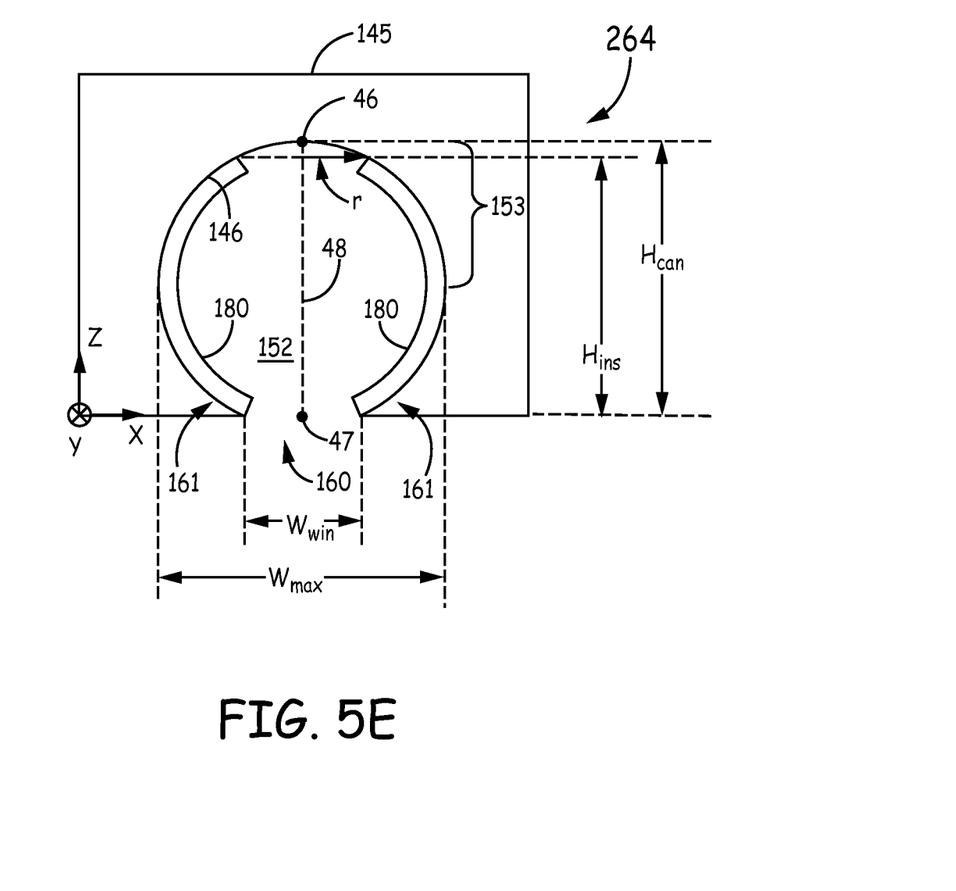

FIG. 5E shows a cross-sectional view of an embodiment of a partially-insulated cathode 264 in which the insulating material 180 covers most of the cavity surface 146 from the cavity opening 160 up to the insulation height $H_{ins}$ that is close to $H_{cav}$. The insulating material 180 forces plasma 40 in the plasma chamber 41 (FIG. 3) to be directed to and shorted to a relatively small preferred portion of the partially-insulated cathode 264. This increases the sputter life of the partially-insulated cathode 264 as described above. The preferred portion of the partially-insulated cathode 264 is the area of the partially-insulated cathode 250 on the inner-dome surface 137 in the region of peak point 46 that opposes the cavity opening 160 and that is not covered by the insulating material 180. As shown in FIG. 5E, a circular area $\pi r^2$ centered on the peak point 46 is not covered by the insulating material 180. In this manner, the plasma is forced to short to this relatively small circular area $\pi r^2$ centered around the peak point 46.

The partially-insulated cathodes 150, 250, and 260-263 shown in FIGS. 1A, 2A, and 5A-5D can also be configured with the insulating material 180 covers most of the cavity surface 146 from the cavity opening 160 up to the insulation height $H_{ins}$ that is close to $H_{cav}$ to force the plasma 50 to an even smaller area than is shown in FIGS. 1A, 2A, and 5A-5D.

Figure 6:
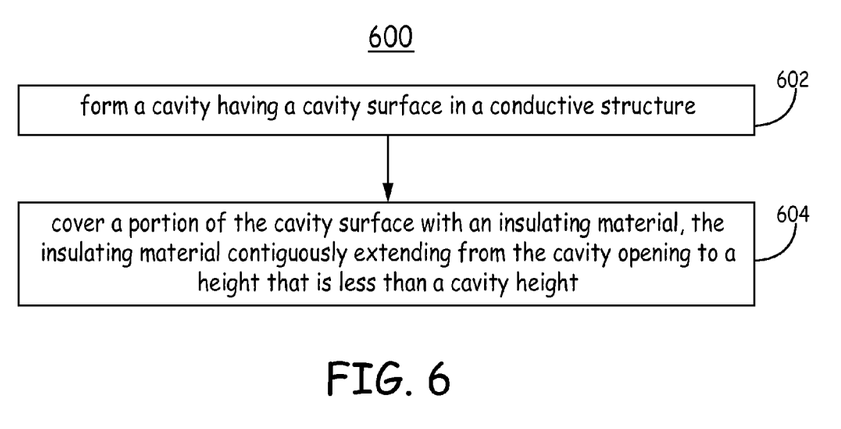
FIG. 6 shows an embodiment of a method of making a partially-insulated cathode in accordance with the present application.

FIG. 6 shows an embodiment of a method 600 of making a partially-insulated cathode in accordance with the present application. Method 600 is applicable to the partially-insulated cathodes described herein, including partially-insulated cathode 150, 250, and 260-264 as shown in FIGS. 1A, 2A, and 5A-5E, respectively. Method 600 is applicable to other partially-insulated cathodes having variations upon the shapes described herein.

At block 602, a cavity 152 having a cavity surface 146 is formed in a conductive structure 145. The cavity 152 has cavity height $H_{cav}$. Cross-sections of the cavity in X-Y planes have at least one respective cavity-width $W_{min}$. The cavity opening 160 has a diameter D less than a minimum cavity-width $W_{min}$ by twice the thickness $t_{ins}$ of the insulating material 180. If the thickness $t_{ins}$ is very thin (e.g., 10 microns or less) then the cavity opening 160 has a diameter D that is approximately the minimum cavity-width $W_{min}$. In one implementation of this embodiment, the cavity 152 has the shape of a dome 153 conjoined to a cylinder 154.

In one implementation of this embodiment, the conductive structure 145 is machined. In another implementation of this embodiment, the conductive structure 145 is formed by casting of the cathode. In yet another implementation of this embodiment, the conductive structure 145 is formed by sintering a blank (i.e., a metal block). In yet another implementation of this embodiment, the conductive structure 145 is formed from aluminum. In yet another implementation of this embodiment, the conductive structure 145 is formed from another metal or alloy of metals.

At block 604, a portion 155 of the cavity surface 146 of the cavity 152 is covered with an insulating material 180. The insulating material 180 contiguously extends from the cavity opening 160 up to an insulation height $H_{ins}$ that is less than the cavity height $H_{cav}$.

In one implementation of this embodiment, covering the insulating material 180 on the portion 155 of the cavity surface 146 of the cavity 152 is implemented by chemically treating the portion 155 of the cavity surface 146. In another implementation of this embodiment, covering the insulating material 180 on the portion 155 of the cavity surface 146 of the cavity 152 is implemented by depositing an epoxy coating on the portion 155 of the cavity surface 146 of the cavity 152. In yet another implementation of this embodiment, covering the insulating material 180 on the portion 155 of the cavity surface 146 of the cavity 152 is implemented by depositing at least one thin film on the portion 155 of the cavity surface 146 of the cavity 152. In this latter case, the at least one thin film is formed from a non-conductive material. In yet another implementation of this embodiment, covering the insulating material 180 on the portion 155 of the cavity surface 146 of the cavity 152 is implemented by sputtering the insulating material 180 on the portion 155 of the cavity surface 146 of the cavity 152. In yet another implementation of this embodiment, covering the insulating material 180 on the portion 155 of the cavity surface 146 of the cavity 152 is implemented by dipping the cavity opening 160 of the conductive structure 145 in the insulating material 180. In yet another implementation of this embodiment, covering the insulating material 180 on the portion 155 of the cavity surface 146 of the cavity 152 is implemented by spin coating the insulating material 180 on the portion 155 of the cavity surface 146 of the cavity 152. In yet another implementation of this embodiment, an insulating barrier is inserted into the cavity opening 160. For example, an insulating cylinder can be inserted into the cavity opening 160.

In yet another implementation of this embodiment, the insulating material 180 covers the cavity surface 146 from the cavity opening 160 up to the insulation height $H_{ins}$ that is less than fifty percent of the cavity height $H_{cav}$. In yet another implementation of this embodiment, the insulating material 180 covers the cavity surface 146 from the cavity opening 160 up to the insulation height $H_{ins}$ that is less than seventy-five percent of the cavity height $H_{cav}$.

EXAMPLE EMBODIMENTS

Example 1 includes a partially-insulated cathode for exciting plasma in a plasma chamber, the partially-insulated cathode comprising: a conductive structure enclosing a cavity having a cavity surface, wherein cross-sections of the cavity in X-Y planes have at least one respective cavity-width, wherein a cavity opening has a diameter less than a minimum cavity-width of the at least one cavity-width; and an insulating material contiguously covering a portion of the cavity surface from the cavity opening up to an insulation height that is less than a cavity height.

Example 2 includes the partially-insulated cathode of Example 1, wherein the at least one cavity-width includes a maximum cavity-width and the minimum cavity-width, and wherein the cavity includes a step from the minimum cavity-width to the maximum cavity-width, wherein the insulating material covers the cavity surface having the minimum cavity-width.

Example 3 includes the partially-insulated cathode of Example 2, wherein the insulating material further covers a surface of the step, the insulating material covering the surface of the step being contiguous with the insulating material covering the cavity surface having the minimum cavity-width.

Example 4 includes the partially-insulated cathode of Example 3, wherein the insulating material further covers a portion of the cavity surface having the maximum cavity-width, wherein the insulating material covering the surface of the step is contiguous with the insulating material covering the portion of the cavity surface having the maximum cavity-width.

Example 5 includes the partially-insulated cathode of any of Examples 1-4, wherein at least one cavity-width includes a maximum cavity-width and the minimum cavity-width.

Example 6 includes the partially-insulated cathode of Example 5, wherein at least a portion of the cavity surface having the maximum cavity-width is uncovered by the insulating material.

Example 7 includes the partially-insulated cathode of any of Examples 5-6, the cavity further including: an opening-portion in which a width of the opening-portion continuously changes from the minimum cavity-width to the maximum cavity-width, wherein the opening-portion of the cylinder is covered by the insulating material.

Example 8 includes the partially-insulated cathode of any of Examples 1-7, wherein the cavity is formed in the shape of a dome conjoined with a cylinder, the cylinder having an inner-cylinder surface that forms a portion of the cavity surface, the dome having an inner-dome surface that forms another portion of the cavity surface.

Example 9 includes a method of making a partially-insulated cathode, the method comprising: forming a cavity having a cavity surface in a conductive structure, wherein cross-sections of the cavity in X-Y planes have at least one respective cavity-width, wherein a cavity opening has a diameter less than a minimum cavity-width of the at least one cavity-width; and covering a portion of the cavity surface with an insulating material, the insulating material contiguously extending from the cavity opening up to an insulation height that is less than a cavity height.

Example 10 includes the method of Example 9, wherein forming the cavity having the cavity surface in the conductive structure, comprises: machining the conductive structure.

Example 11 includes the method of Example 10, wherein covering the portion of the cavity surface with the insulating material comprises at least one of: chemically treating the portion of the cavity surface; depositing an epoxy coating on the portion of the cavity surface; depositing at least one thin film on the portion of the cavity surface; and inserting an insulating barrier into the cavity opening.

Example 12 includes the method of any of Examples 10-11, wherein covering the portion of the cavity surface with the insulating material comprises: sputtering the insulating material on the portion of the cavity surface.

Example 13 includes the method of any of Examples 10-12, wherein covering the portion of the cavity surface with the insulating material comprises: dipping the cavity opening of the conductive structure in the insulating material.

Example 14 includes the method of any of Examples 10-13, wherein covering the insulating material on the portion of the cavity surface comprises: spin coating the insulating material on the portion of the cavity surface.

Example 15 includes a gas discharge device comprising: a block arranged to support a gas discharge in an interior passage; and a partially-insulated cathode attached to the block, the partially-insulated cathode including: a conductive structure enclosing a cavity having a cavity surface, wherein cross-sections of the cavity in X-Y planes have at least one respective cavity-width, wherein a cavity opening has a diameter less than a minimum cavity-width of the at least one cavity-width; and an insulating material contiguously covering a portion of the cavity surface from the cavity opening up to an insulation height that is less than the cavity height.

Example 16 includes the gas discharge device of Example 15, further comprising: at least one anode attached to the block and open to the interior passage; and at least three mirrors arranged so that the interior passage and the at least three mirrors define a plasma chamber in the form of a closed laser resonant path.

Example 17 includes the gas discharge device of any of Examples 15-16, wherein at least one cavity-width includes a maximum cavity-width and the minimum cavity-width, wherein the cavity includes a step from the minimum cavity-width to the maximum cavity-width, wherein the insulating material covers the cavity surface having the minimum cavity-width, and wherein the insulating material further covers a surface of the step, the insulating material covering the surface of the step being contiguous with the insulating material covering the cavity surface having the minimum cavity-width.

Example 18 includes the gas discharge device of Example 17, wherein the insulating material further covers a portion of the cavity surface having the maximum cavity-width, wherein the insulating material covering the surface of the step is contiguous with the insulating material covering the portion of the cavity surface having the maximum cavity-width.

Example 19 includes the gas discharge device of any of Examples 15-18, wherein at least a portion of the cavity surface having the maximum cavity-width is uncovered by the insulating material.

Example 20 includes the gas discharge device of any of Examples 15-19, wherein plasma is shorted to one of: the portion of the cavity surface having the maximum cavity-width; or an uncovered portion of the cavity surface centered around a peak point on the cavity surface that opposes the cavity opening.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A partially-insulated cathode for exciting plasma in a plasma chamber, the partially-insulated cathode comprising:
   a conductive structure enclosing a cavity having a cavity surface, wherein cross-sections of the cavity in X-Y planes have at least one respective cavity-width; and
   an insulating material contiguously covering a portion of the cavity surface from a cavity opening up to an insulation height that is less than a cavity height, wherein the cavity opening has a diameter less than a minimum cavity-width of the at least one cavity-width.

2. The partially-insulated cathode of claim 1, wherein the at least one cavity-width includes a maximum cavity-width and the minimum cavity-width, and wherein the cavity includes a step from the minimum cavity-width to the maximum cavity-width, wherein the insulating material covers the cavity surface having the minimum cavity-width.

3. The partially-insulated cathode of claim 2, wherein the insulating material further covers a surface of the step, the insulating material covering the surface of the step being contiguous with the insulating material covering the cavity surface having the minimum cavity-width.

4. The partially-insulated cathode of claim 3, wherein the insulating material further covers a portion of the cavity surface having the maximum cavity-width, wherein the insulating material covering the surface of the step is contiguous with the insulating material covering the portion of the cavity surface having the maximum cavity-width.

5. The partially-insulated cathode of claim 1, wherein at least one cavity-width includes a maximum cavity-width and the minimum cavity-width.

6. The partially-insulated cathode of claim 5, wherein at least a portion of the cavity surface having the maximum cavity-width is uncovered by the insulating material.

7. The partially-insulated cathode of claim 5, the cavity further including:
   an opening-portion in which a width of the opening-portion continuously changes from the minimum cavity-width to the maximum cavity-width, wherein the opening-portion of the cylinder is covered by the insulating material.

8. The partially-insulated cathode of claim 1, wherein the cavity is formed in the shape of a dome conjoined with a cylinder, the cylinder having an inner-cylinder surface that forms a portion of the cavity surface, the dome having an inner-dome surface that forms another portion of the cavity surface.

9. A method of making a partially-insulated cathode, the method comprising:
   forming a cavity having a cavity surface in a conductive structure, wherein cross-sections of the cavity in X-Y planes have at least one respective cavity-width; and
   covering a portion of the cavity surface with an insulating material, the insulating material contiguously extending from a cavity opening up to an insulation height that is less than a cavity height, wherein the cavity opening has a diameter less than a minimum cavity-width of the at least one cavity-width.

10. The method of claim 9, wherein forming the cavity having the cavity surface in the conductive structure, comprises:
    machining the conductive structure.

11. The method of claim 10, wherein covering the portion of the cavity surface with the insulating material comprises at least one of: chemically treating the portion of the cavity surface; depositing an epoxy coating on the portion of the cavity surface; depositing at least one thin film on the portion of the cavity surface; and inserting an insulating barrier into the cavity opening.

12. The method of claim 10, wherein covering the portion of the cavity surface with the insulating material comprises:
    sputtering the insulating material on the portion of the cavity surface.

13. The method of claim 10, wherein covering the portion of the cavity surface with the insulating material comprises:
    dipping the cavity opening of the conductive structure in the insulating material.

14. The method of claim 10, wherein covering the insulating material on the portion of the cavity surface comprises:
    spin coating the insulating material on the portion of the cavity surface.

15. A gas discharge device comprising:
    a block arranged to support a gas discharge in an interior passage; and
    a partially-insulated cathode attached to the block, the partially-insulated cathode including:
       a conductive structure enclosing a cavity having a cavity surface, wherein cross-sections of the cavity in X-Y planes have at least one respective cavity-width; and
       an insulating material contiguously covering a portion of the cavity surface from a cavity opening up to an insulation height that is less than the cavity height, wherein the cavity opening has a diameter less than a minimum cavity-width of the at least one cavity-width.

16. The gas discharge device of claim 15, further comprising:
    at least one anode attached to the block and open to the interior passage; and
    at least three mirrors arranged so that the interior passage and the at least three mirrors define a plasma chamber in the form of a closed laser resonant path.

17. The gas discharge device of claim 15, wherein at least one cavity-width includes a maximum cavity-width and the minimum cavity-width, wherein the cavity includes a step from the minimum cavity-width to the maximum cavity-width, wherein the insulating material covers the cavity surface having the minimum cavity-width, and wherein the insulating material further covers a surface of the step, the insulating material covering the surface of the step being contiguous with the insulating material covering the cavity surface having the minimum cavity-width.

18. The gas discharge device of claim 17, wherein the insulating material further covers a portion of the cavity surface having the maximum cavity-width, wherein the insulating material covering the surface of the step is contiguous with the insulating material covering the portion of the cavity surface having the maximum cavity-width.

19. The gas discharge device of claim 15, wherein at least a portion of the cavity surface having the maximum cavity-width is uncovered by the insulating material.

20. The gas discharge device of claim 15, wherein plasma is shorted to one of: the portion of the cavity surface having the maximum cavity-width; or an uncovered portion of the cavity surface centered around a peak point on the cavity surface that opposes the cavity opening.

* * * * *